United States Patent
Imayama et al.

(10) Patent No.: US 7,158,766 B2
(45) Date of Patent: Jan. 2, 2007

(54) WIDEBAND AMPLIFIER COMPENSATING INPUT CAPACITANCE, RADIO TRANSCEIVER, SEMICONDUCTOR INTEGRATED CIRCUIT AND WIDEBAND AMPLIFICATION METHOD

(75) Inventors: Teruo Imayama, Kanagawa-ken (JP); Tsuneo Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 668 days.

(21) Appl. No.: 10/387,391

(22) Filed: Mar. 14, 2003

(65) Prior Publication Data

US 2003/0176172 A1 Sep. 18, 2003

(30) Foreign Application Priority Data

Mar. 14, 2002 (JP) .............................. 2002-070973

(51) Int. Cl.
*H04B 1/00* (2006.01)
*H04B 7/00* (2006.01)

(52) U.S. Cl. ...................... 455/130; 455/91; 455/250.1

(58) Field of Classification Search ................ 455/130, 455/91, 148, 73, 131, 136, 138, 168.1, 194.2, 455/197.2, 232.1, 234.1, 245.1, 333, 250.1, 455/252.1, 251.1, 311; 330/260, 292, 291, 330/269, 253, 255
See application file for complete search history.

(56) References Cited

U.S. PATENT DOCUMENTS

| 4,731,873 | A | * | 3/1988 | Voyce ........................ 455/219 |
| 4,885,548 | A | * | 12/1989 | Wakimoto et al. .......... 330/260 |
| 5,652,545 | A | * | 7/1997 | Miyashita et al. .......... 330/269 |
| 6,259,901 | B1 | * | 7/2001 | Shinomiya et al. ........... 455/91 |
| 6,369,743 | B1 | * | 4/2002 | Ono ........................... 341/159 |
| 7,006,583 | B1 | * | 2/2006 | Ho et al. .................... 455/334 |
| 7,013,123 | B1 | * | 3/2006 | Takikawa et al. ........... 455/333 |

FOREIGN PATENT DOCUMENTS

| JP | 1-105605 | 4/1989 |
| JP | 11-88064 | 3/1999 |
| JP | 11-112381 | 4/1999 |
| JP | 2000-31760 | 1/2000 |
| JP | 2001-189633 | 7/2001 |
| JP | 2001-237316 | 8/2001 |

* cited by examiner

*Primary Examiner*—Aung Moe
(74) *Attorney, Agent, or Firm*—Oblon, Spivak, McClelland, Maier & Neustadt, P.C.

(57) ABSTRACT

A radio transceiver encompasses an antenna unit configured to convert the electric wave to the electric signal, a receiver configure to generate the compensation current supplied to load having an output capacity based on the electric signal and the second in-phase signal of an in-phase, a transmitter configured to transmit the signal, and a baseband circuit configured to transmit and to receive of the signal.

9 Claims, 18 Drawing Sheets

WIDEBAND AMPLIFIER COMPENSATING INPUT CAPACITANCE, RADIO TRANSCEIVER, SEMICONDUCTOR INTEGRATED CIRCUIT AND WIDEBAND AMPLIFICATION METHOD

CROSS REFERENCE TO RELATED APPLICATIONS

This application is based upon and claims the benefit of priority from the prior Japanese Patent Applications No. P2002-070973, filed on Mar. 14, 2002; the entire contents of which are incorporated herein by reference.

BACKGROUND OF THE INVENTION

1. Field of the Invention

The present invention relates to a wideband amplifier, and more particularly, to a radio transceiver, a semiconductor integrated circuit adapted for implementer the radio transceiver, and a wideband amplification method.

2. Description of the Related Art

A differential amplifier is used by radio transceivers such as a wireless LAN device or other information transceiver. The differential amplifier consists of a buffer and an amplifier connected to the output side of the buffer. As an amplifier, the differential amplifier is used generally. The differential amplifier uses dual transistors both having parasitic input capacitance, which is an adjunct of a base terminal. A cross-coupled compensator is employed in order to compensate for input capacitance. The cross-coupled compensator consists of two amplification transistors. Two amplification transistors have a collector terminal and a base terminal connected each other. In addition, two amplification transistors have compensation capacitor between each other's base and emitter terminals. The compensation current flows junction capacitance or mirror capacitance of input transistors. In a cross-coupled compensator, amplification transistors have voltage drop between the base and emitter terminals, because the amplification transistors are connected between the output side of the buffers and grounds. The cross-coupled compensator is not suitable for low voltage operation. In addition, dynamic range of the differential amplifiers becomes narrow, because the differential dual transistors have own base and collector terminals which are connected each other. The differential amplifier is not suitable for large signal applications. For example, the voltage of the base and emitter terminals of the transistor is supposed to be 0.7V, the saturation voltage of a transistor is supposed to be 0.2V, and the dynamic range of the differential amplifiers is to be 1.0Vpp. The voltage of the base and emitter terminals decreases 0.1V in a high temperature. In other words, the dynamic range of the amplifier becomes narrower when the junction temperature becomes high. This time, dynamic range in differential operation becomes 0.8Vpp.

SUMMARY OF THE INVENTION

A radio transceiver comprises, an antenna unit configured to convert the electromagnetic wave to the received signal, a receiver having a frequency characteristic compensators configure to generate first and second in-phase signals having same phase of the received signal and a compensation current base on capacitance determined by the second in-phase signal to generate a first feedback signal, and to supply the compensation current thorough the first feedback signal to an output capacitance, a transmitter configured to supply a transmitting signal to the antenna unit, a local oscillator configured to generate a clock for the receiver and the transmitter, and a baseband circuit configured to process the received signal fed from the receiver and to generate signal so as to supply to the transmitter.

A semiconductor integrated circuit comprises, a semiconductor chip, a low noise amplifier integrated on the semiconductor chip connected to the terminal configured to receive the electrical signal, a mixer integrated on the semiconductor chip connected to an output sides of the low noise amplifier and a local oscillator, a automatic gain control amplifier integrated on the semiconductor chip connected to an output side of the mixer, and having a receiver configure to generate the compensation current supplied to the load capacity based on the electric signal and the second in-phase signal of an in-phase, and a quadrature demodulator integrated on the semiconductor chip connected to the output side of the automatic gain control amplifier.

A wideband amplification method comprises, receiving an input signal, generating first and second in-phase signals having the same phase of the input signal, generating a compensation current using a compensation capacitance and the second in-phase signal, generating a feedback signal based on the compensation current feed back to the first in-phase signal, and amplifying the feedback signal.

DETAILED DESCRIPTION OF THE INVENTION

Figure 1:
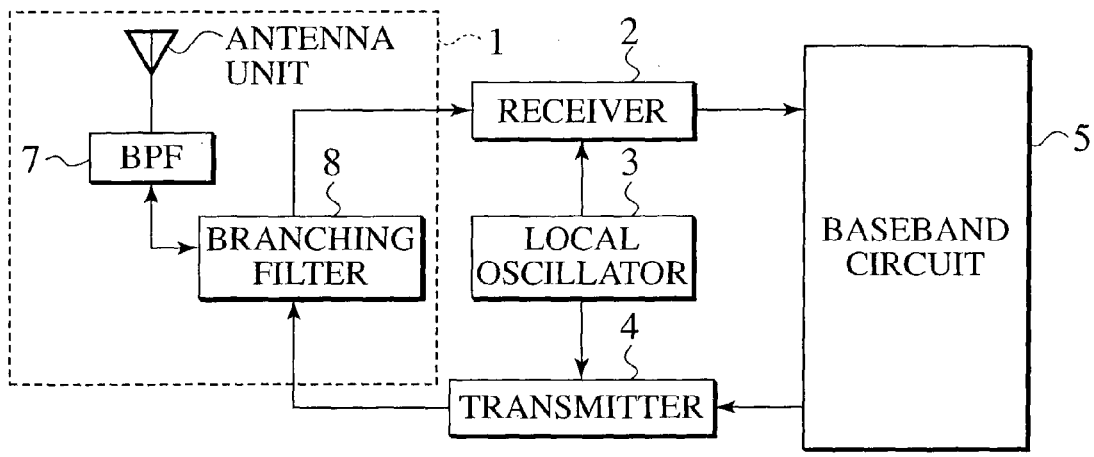
FIG. 1 is a diagram showing a configuration of a radio transceiver according to first to fourth embodiments of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Radio Transceiver

As shown in FIG. 1, the radio transceiver using a wideband amplifier 10a–10h according to the first to the fourth embodiment of the present invention encompasses an antenna unit 1, a receiver 2 connected to the antenna unit 1, a transmitter 4 connected to the antenna unit 1, a local oscillator 3 connected to the receiver 2 and the transmitter 4, and a baseband circuit 5 connected to an output side of the receiver 2 and an input side of the transmitter 4. The antenna unit 1 comprises antenna 6, a first band path filter (BPF) 7 connected to the antenna 6, and a branching filter 8 connected to the BPF7.

Figure 2:
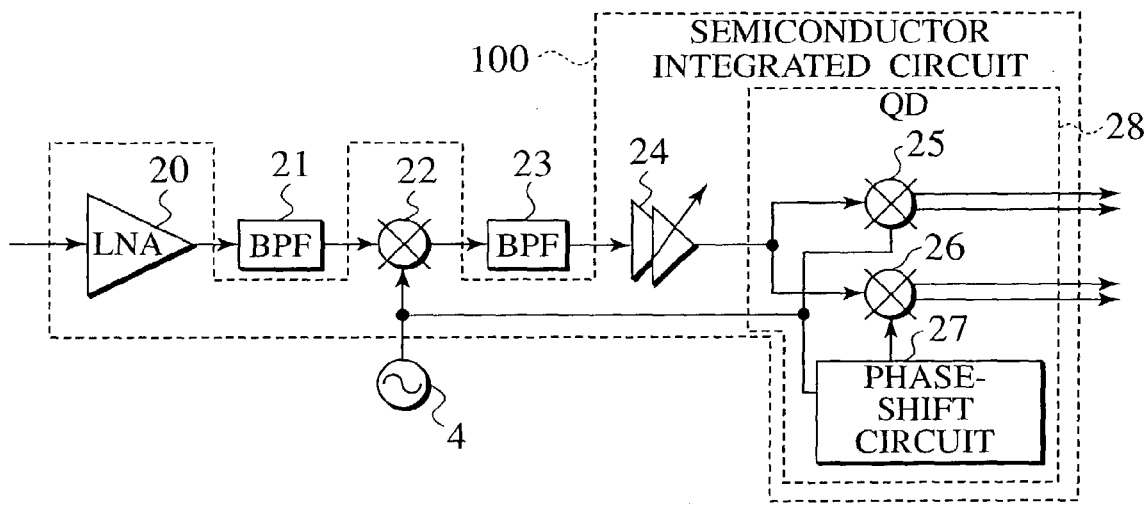
FIG. 2 is a diagram showing a configuration of a receiver of the radio transceiver according to first to fourth embodiments of the present invention.

As shown in FIG. 2, the receiver 2 encompasses a low noise amplifier (LNA) 20 connected to an output side of the branching filter 8A first band path filter (BPF) 21 connected to an output side of the LNA20, an first mixer (MIX) 22 connected to each output sides of the local oscillator 4 and the BPF21, a second band path filter (BPF) 23 connected to an output side of the MIX22, a automatic gain control amplifier (AGC) 24 connected to an output side of the BPF23, a quadrature demodulator (QD) 28 connected to an output side of the AGC24. The QD28 encompasses a MIX25 connected to each output sides of the local oscillator 4 and the output side of the AGC24, a phase-shift circuit 27 connected to the output side of local oscillator 4, and a MIX26 connected to each output sides of the AGC24 and the phase-shift circuit 27.

Figure 3:
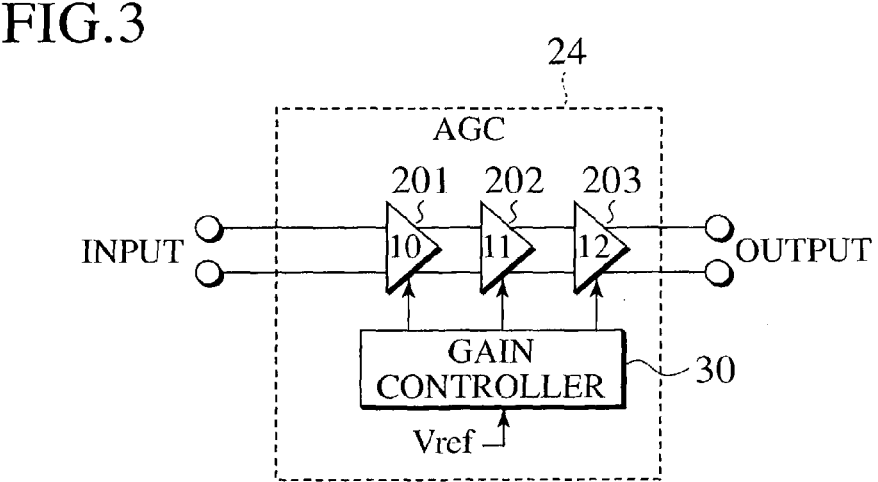
FIG. 3 is a diagram showing a configuration of a automatic gain control amplifier of the receiver according to first to fourth embodiments of the present invention.

As shown in FIG. 3, the AGC24 comprises three wideband amplifiers 201, 202, and 203 connected in tandem so as to implement a three stage amplifier, and a gain controller 30 connected each control terminal of the wideband amplifiers 201, 202, and 203. The wideband amplifiers 201, 202, and 203 can employ either of the wideband amplifiers 10a, 10b, 10c, 10d, 10e, 10f, 10g, 10h described below. Nevertheless, the wideband amplifiers 201, 202, and 203 are explained as the same circuit. Reference voltage Vref is transmitted to gain controller 30. In AGC24 shown in FIG. 3, the wideband amplifiers 201, 202, and 203 may be one wideband amplifier. Furthermore, the wideband amplifiers 201, 202, and 203 may be cascade-connect by the arbitrary number.

The radio transceiver using the wideband amplifiers 10a–10h according to the first to the fourth embodiment of the present invention is explained dividing into the receiving case and the transmitting case. The detail of a function of the receiver 3 is described below.

Receiving Case:

The antenna 1 receives an electromagnetic wave, which is converted to an electric signal. The BPF7 passes only a specific frequency range of a signal transmitted by the antenna 1. Nevertheless the input wave fed to the antenna 1 is not limited to electromagnetic waves such as a microwave, a millimeter wave. For example, instead of the antenna 1 we can use an ultrasonic sensor so as to receive a ultrasonic wave. Furthermore, a cable broad casting network may be used instead of the antenna 1. The branching filter 8 transmits the electric signal from the BPF7 to the LNA20. The LNA20 amplifies a signal transmitted from the BPF7. The BPF21 passes only a specific frequency range of a signal transmitted from the LNA20. The MIX22 synthesizes the signals transmitted form the BPF21 and transmitted from the local oscillator 4. The BPF23 passes only a specific frequency range of a signal transmitted from the MIX22. The amplification factor of the wideband amplifiers 201, 202 and 203 is set based on the reference voltage Vref The wideband amplifiers 201, 202, and 203 amplify a signal transmitted from BPF23. The phase-shift circuit 27 generates the signal shifted 90 degrees out of phase against the signal transmitted from the local oscillator 4. The MIX25 synthesizes the signal transmitted from the wideband amplifier 203 and the signal transmitted from the local oscillator 4. The MIX26 synthesizes the signals transmitted from the wideband amplifier 203 and transmitted from the phase-shift circuit 27.

Transmitting Case:

The baseband circuit 5 transmits a signal to the transmitter4. The transmitter 4 modulates a signal transmitted from the baseband circuit 5. The branching filter 8 transmits a signal transmitted from the transmitter 4 to the BPF7. The BPF7 passes only the specific frequency range of the signal transmitted from the branching filter 8. The antenna 1 emits the electromagnetic wave converted from the signal transmitted from the BPF7.

The radio transceiver using at least one of the wideband amplifiers 10a–10h of the present invention enables the dynamic range of the amplifier to be widened, and to operate with low voltage.

Semiconductor Integrated Circuit

Figure 4:
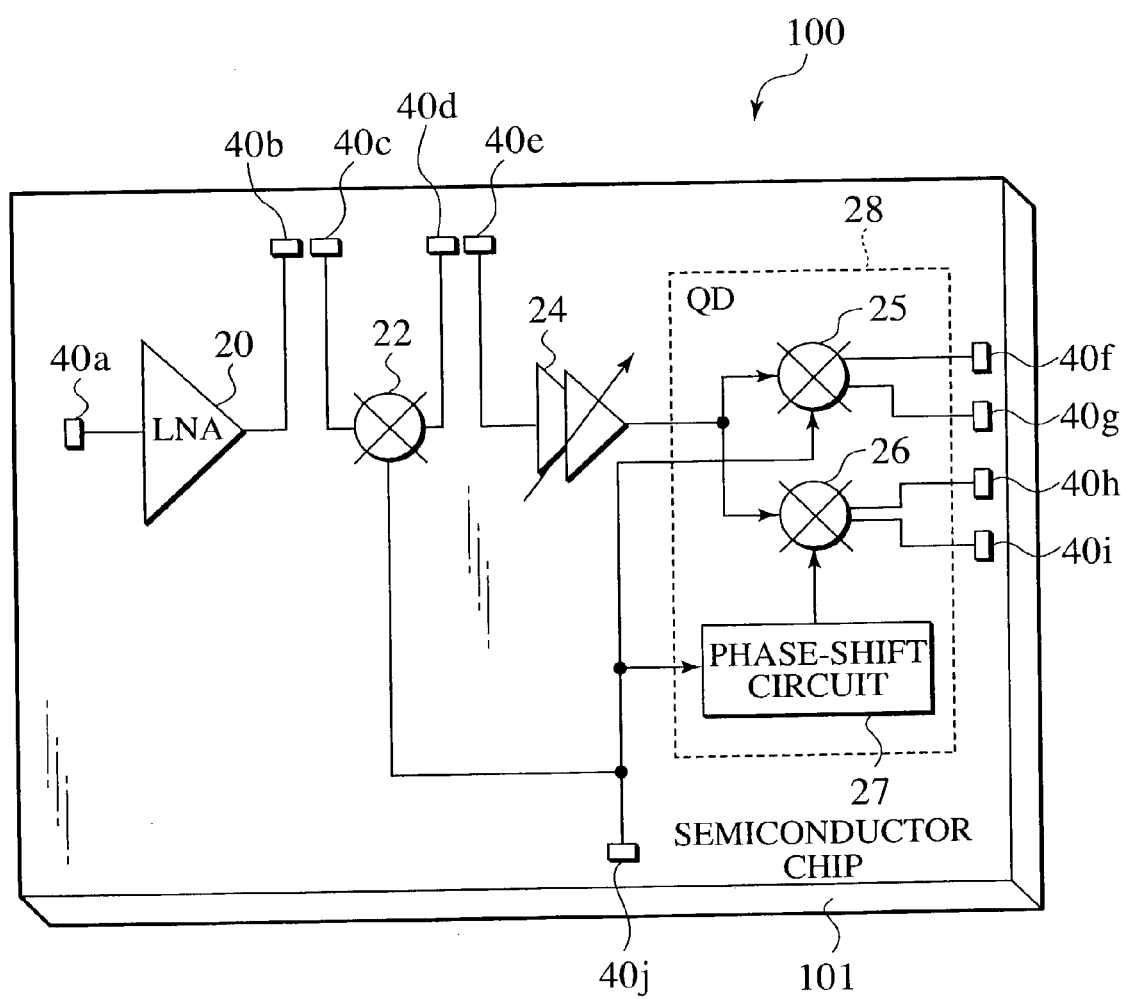
FIG. 4 is a diagram showing a configuration of a semiconductor integrated circuit including a wideband amplifier according to the first to fourth embodiment of the present invention.

A part of the receiver 2 implemented by one of the wideband amplifier 10a–10h according to the first to the fourth embodiments of the present invention can be the monolithically integrated so as to form a semiconductor integrated circuit 100 shown in FIG. 2 on a same semiconductor chip 101 as shown in FIG. 4. In this case, the LNA20, the MIX22, the AGC24, and the QD28Are merged in the semiconductor chip 101.

The semiconductor chip 101 has a bonding pad 40a electrically connected to the input side of the LNA20. The semiconductor chip 101 has a bonding pad 40b electrically connected to an output side of the LNA20, a bonding pad 40c electrically connected to the first input side of the MIX22, a bonding pad 40d electrically connected to an output side of the MIX22, a bonding pad 40e electrically connected to an input side of the AGC24, a bonding pad 40f electrically connected to the first output side of the QD28A bonding pad 40g electrically connected to the second output side of the QD28A bonding pad 40h electrically connected to the third output side of the QD28A bonding pad 40i electrically connected to the fourth output side of the QD28And a bonding pad 40j electrically connected to the second input side of the MIX22, the second input side of the QD28And the third input side of the QD28. Meanwhile, the output side of the AGC24 is electrically connected to the first input side of the QD28.

The semiconductor chip 101 shown in FIG. 4 is implemented by known CMOS fabrication process. More specifically, the bonding pads 40a–40j are connected to, for example, a plurality of high impurity concentration regions (source region/drain region) formed in and at the surfaces of active are as assigned at the surface of the semiconductor chip 101, where a donor or an acceptor is doped with a concentration of approximately $1 \times 10^{18}$ to $1 \times 10^{21}$ cm$^{-3}$. A plurality of electrodes layers made from a metal such as aluminum (Al) or an aluminum alloy (Al—Si, Al—Cu—Si) are formed so as to implement ohmic contacts with these plurality of high impurity concentration regions. On the top surface of such a plurality of electrode layers, a passivation film such as an oxide film ($SiO_2$), a phosphosilicate glass (PSG) film, a boron-phosphosilicate glass (BPSG) film, a nitride film ($Si_3N_4$), or a polyimide film, is deposited.

A plurality of openings (contact holes) is delineated in a portion of the passivation film so as to expose a plurality of electrode layers, implementing the bonding pads 40a–40f. Alternatively, the bonding pads 40a–40f may be formed as other metal patterns connected to a plurality of electrode layers by using metal wiring. In addition, it is possible to form bonding pads 40a–40f on the polysilicon gate electrodes using a metal film such as aluminum (Al) or an aluminum alloy (Al—Si, Al—Cu—Si). Alternatively, a plurality of other bonding pads may be connected, via a plurality of signal lines such as gate wirings, to the polysilicon gate electrodes. Instead of polysilicon, gate electrodes made of a refractory metal such as tungsten (W), titanium (Ti), or molybdenum (Mo), a silicide (i.e. $WSi_2$, $TiSi_2$, $MoSi_2$), or a polycide containing any of these silicides can be used.

(First Embodiment)

Figure 5A:
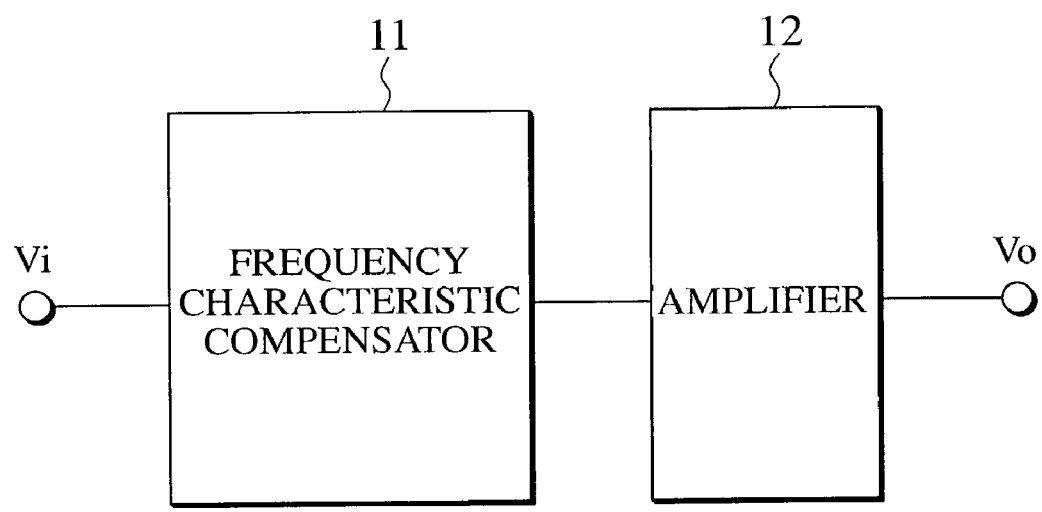
FIG. 5A is a diagram showing a configuration of a wideband amplifier according to the first and second embodiments of the present invention.
Figure 5B:
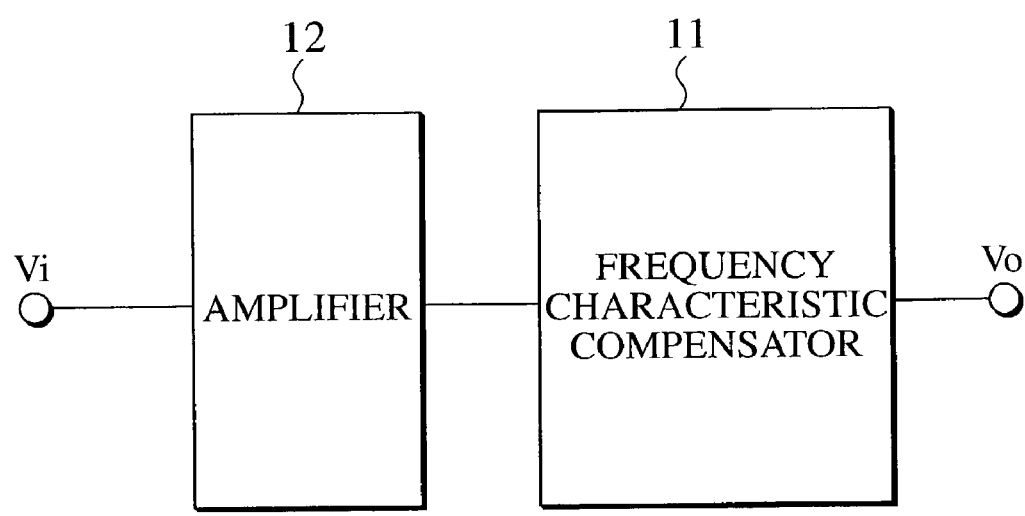
FIG. 5B is a diagram showing a configuration of a wideband amplifier according to the second and third embodiments of the present invention.
Figure 6:
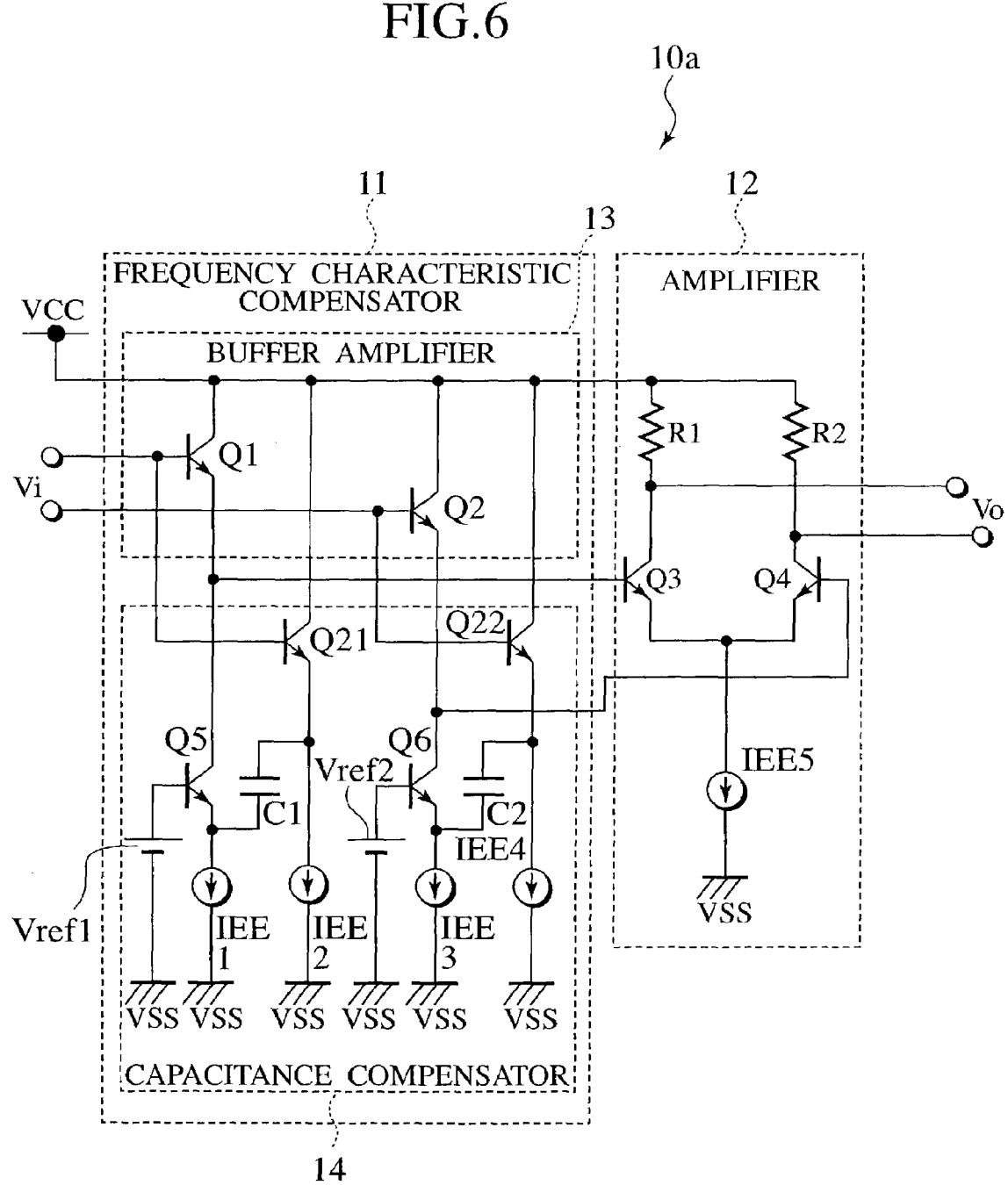
FIG. 6 is a diagram showing a configuration of the wideband amplifier according to the first embodiment of the present invention.

As shown in FIG. 5A, the wideband amplifier 10a according to the first embodiment of the present invention encompasses a frequency characteristic compensator 11 and amplifier 12 connected an output side of the frequency characteristic compensator 11. As shown in FIG. 6, the frequency characteristic compensator 11 has a buffer amplifier 13 and a capacitance compensator 14 connected to the output side of the buffer amplifier 13.

The buffer amplifier 13 includes the first drive-transistor Q1 and the second drive-transistor Q2. The first drive-transistor Q1 has a control electrode connected to the high voltage output side of the BPF23, a first main electrode connected to a high voltage power supply VCC and a second main electrode connected as an output terminal.

As used hereinafter the term "the first main electrode" shall mean a collector electrode, "the second main electrode" shall mean an emitter electrode, and "control electrode" shall mean a base electrode of the npn bipolar transistor.

The capacitance compensator 14 comprises a first buffering transistor Q21, a second buffering transistor Q22, a first feedback-transistor Q5, a second feedback-transistor Q6, a first compensation capacitor C1, and a second compensation capacitor C2. The first buffering transistor Q21 has a second main electrode connected to an output terminal, a control electrode and a first main electrode connected in parallel to the first drive-transistor Q1. The second buffering transistor Q22 has a second main electrode connected an output terminal, a control electrode and a first electrode connected in parallel to the second drive-transistor Q2. The first feedback-transistor Q5 has a control electrode configured to receive the first reference voltage Vref1, a first main electrode connected to an output terminal of the first drive-transistor Q1, and a second main electrode connected to a low voltage power supply VSS via a first constant current source IEE1. The second feedback-transistor Q6 has a control electrode configured to receive the second reference voltage Vref2, a first main electrode connected to an output terminal of the second drive-transistor Q2, a second main electrode connected to the low voltage power supply VSS via a third constant current source IEE3. The first compensation capacitor C1 has an end connected to the main electrode of the first feedback-transistor Q5, to the low voltage power supply VSS via the first constant current source IEE1, and an another end connected to the second main electrode of buffering transistor Q21, to the low voltage power supply VSS via a second constant current source IEE2. The second compensation capacitor C2 has an end connected to the main electrode of the second feedback-transistor Q6, to the low voltage power supply VSS via the third constant current source IEE3, and an another end connected to the second main electrode of buffering transistor Q22, to the low voltage power supply VSS via a fourth constant current source IEE4.

The amplifier 12 encompasses a first amplification transistor Q3 and a second amplification transistor Q4. The first amplification transistor Q3 has a second control electrode connected to the main electrode of the first drive-transistor Q1, a first main electrode connected to the high voltage power supply VCC via a first resistance R1, a second main electrode connected to the low voltage power supply VSS via a constant current source IEE5. The second amplification transistor Q4 has a second control electrode connected to the main electrode of the second drive-transistor Q2, a first main electrode connected to high voltage power supply VCC via a second resistance R2, and a second main electrode connected to the low voltage power supply VSS via the constant current source IEE5.

In the first embodiment, each of the transistors is implemented by a npn bipolar transistor Q1, Q2, Q3, Q4, Q5, Q6, Q21, Q22.

Figure 7A:
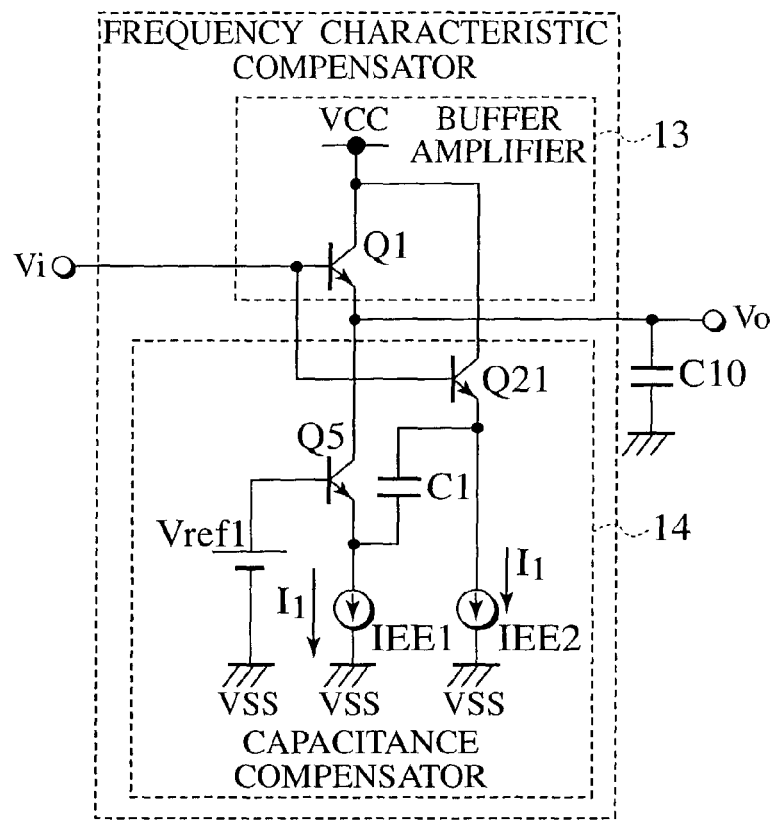
FIG. 7A is a diagram showing a configuration of a frequency characteristic compensator of the wideband amplifier according to the first embodiment of the present invention.
Figure 8A:
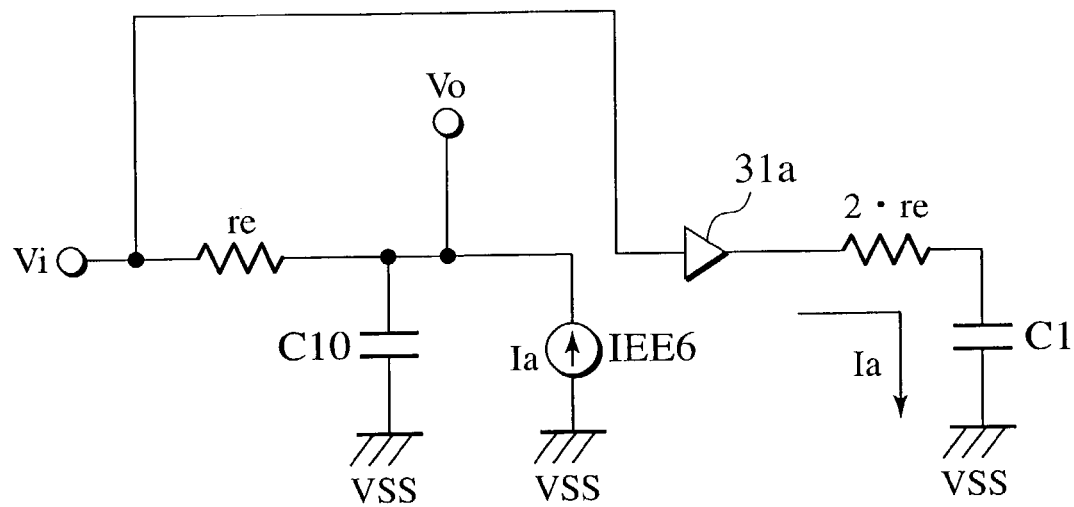
FIG. 8A is a diagram showing a configuration of the equivalent circuit of a frequency characteristic compensator of a wideband amplifier according to the first embodiment of the present invention.

The wideband amplifier 10a according to the first embodiment employs the amplifier 12 encompassing the first amplification transistor Q3 and the second amplification transistor Q4 connected symmetry each other. Therefore, the wideband amplifier 10a shown in FIG. 6 can be expressed as a half-circuit of the first amplification transistor Q3 side as shown in FIG. 7A. In the half-circuit as shown in FIG. 7A, the capacitance C10 represents the junction capacitance of the control electrode of the first amplification transistor Q3 to which current from the first drive-transistor does not flow into. The half-circuit of the wideband amplifier 10a shown at FIG. 7A can be expressed with a small signal equivalent circuit as shown in FIG. 8A.

Here, emitter resistance of the first drive-transistor Q1, the first buffering transistor Q21, the first feedback-transistor Q5 assumed to be "re" respectively, and the first buffering transistor Q21 is assumed to be equivalent with buffer amplifier 31a. Furthermore a control electrode of the first feedback-transistor Q5 is grounded. The current source IEE6 provides current Ia so as to flow into the buffer amplifier 31b shown in FIG. 8B.

The transfer function T(s) of the signal amplification-transistor circuit is expressed:

$$T(s)=(1+3 \cdot s \cdot C1 \cdot re)/(1+2 \cdot (s \cdot re)^2 \cdot C10 \cdot C1 + s \cdot (C10 \cdot re + 2 \cdot C1 \cdot re)) \quad (1)$$

Here, s=j ω, the "k" is Boltzmann constant, "T" is the absolute temperature, "q" is the magnitude of electronic charge, VT=kT/q, and re=VT/I1.

Furthermore, with C10=C1=1 F, re=1 Ω, the Eq. (1) is expressed:

$$T(j\omega)=(1+j3\omega)/(1-2\cdot\omega^2+j3\omega) \quad (2)$$

Figure 7B:
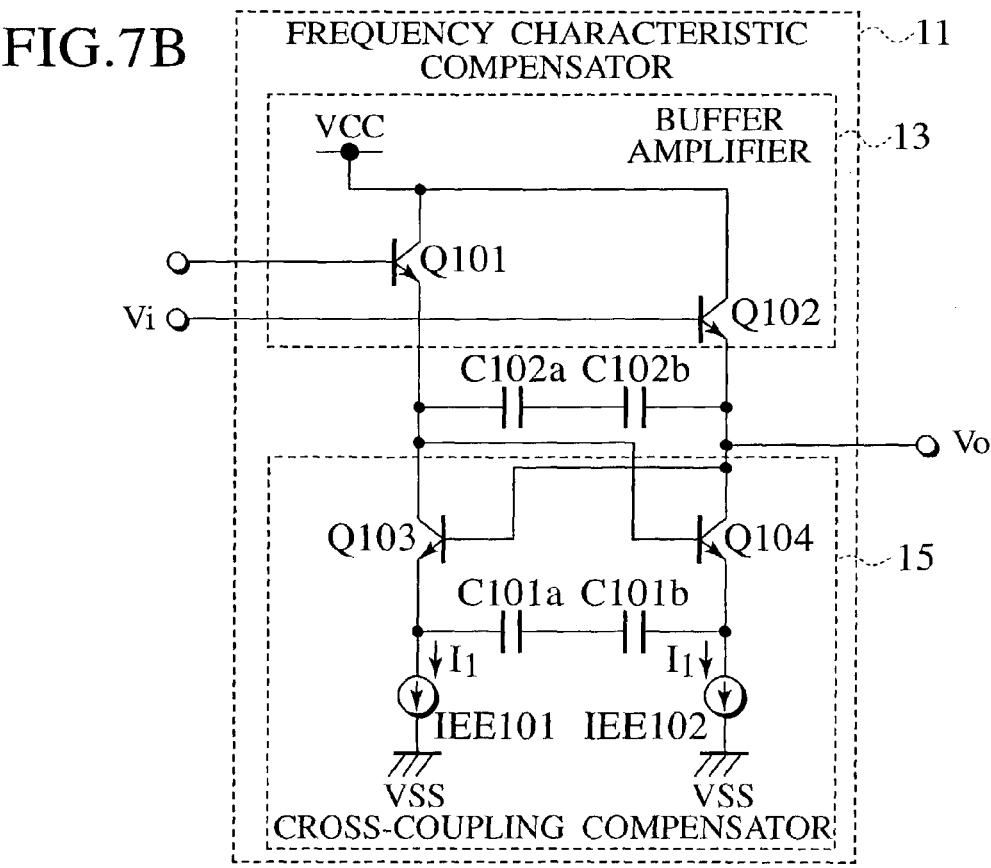
FIG. 7B is a diagram showing a configuration of a frequency characteristic compensator using a cross-coupled compensator according to the prior art.
Figure 8B:
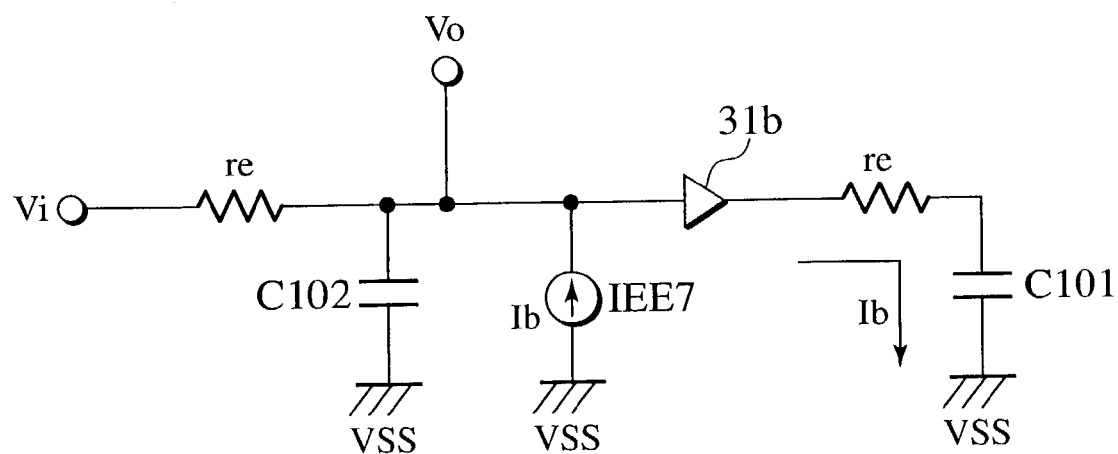
FIG. 8B is a diagram showing a configuration of an equivalent circuit of a frequency characteristic compensator using a cross-coupled compensator according to the prior art.

Because dual amplification transistors Q3, Q4 of the amplifier 12 are symmetric, the wideband amplifier using the cross coupling compensator can be explained as a circuit shown in FIG. 7B. Here C102a and C102b are assumed to be base junction capacitances of the amplification transistors Q3, Q4 in the condition that each of the currents do not flow. Furthermore, the circuit shown in FIG. 7B can be expressed with a small signal equivalent circuit as shown in FIG. 8B. The transfer function T(s) of a small signal equivalent circuit shown in FIG. 8B is expressed:

$$T(s)=(1+s\cdot C101 \cdot re)/(1+(s\cdot re)^2 \cdot C102 \cdot C101 + s \cdot (C102 \cdot re + C101 \cdot re \cdot C101 \cdot re)) \quad (3)$$

Substituting C101=0.65 F, C102=1 F, re=1 Ω for an Eq. (3), the transfer function T(s) of the half-circuit shown in FIG. 7A is expressed:

$$T(j\omega)=(1+(j\omega)^2+j\omega)=(1+j\omega)/(1-\omega^2 j\omega) \quad (4)$$

Figure 9:
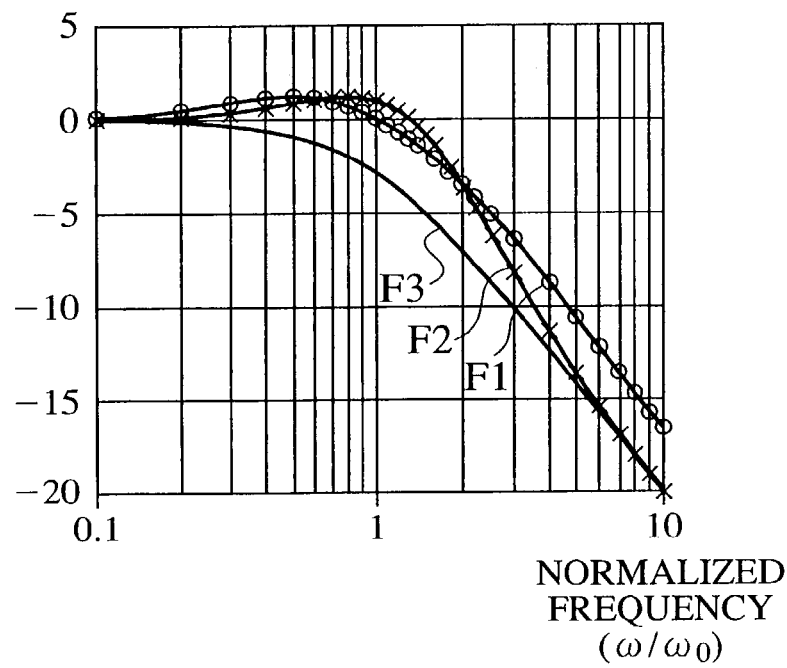
FIG. 9 shows the simulation frequency characteristics of the frequency characteristic compensator of a wideband amplifier according to the first embodiment of the present invention.

Substituting C10=C1=1 F, re=1 Ω for an Eq. (1), the half-circuit shown in FIG. 7A shows a frequency response of the transfer function T(jω) as shown in F1 of FIG. 9. The equivalent half-circuit shown in FIG. 8B sows a frequency response of the transfer function T(jω) as shown in F2 of FIG. 9.

The transfer function T(s) using only buffer amplifier 13 is expressed:

$$T(s)=1/(1+s\cdot C10 \cdot re) \quad (5)$$

Substituting C10=1 F, re=1 Ω, Eq. (5) is expressed:

$$T(j\omega)=1/(1+j\omega) \quad (6)$$

Substituting C10=C1=1F, re=1Ω, for Eq. (1), the transfer function of a half-circuit shown in FIG. 7A is represented by a curve F1 of FIG. 9. Substituting C101=0.65F, C102=1F, re=1Ω, for Eq. (3), the transfer function of a half-circuit shown in FIG. 8B is represented by a curve F2 of FIG. 9. Substituting C10=1 F, re=1Ω, for Eq. (5), the transfer function of amplifier 12 is represented by a curve F3 of FIG. 9. But the normalized frequency ω corresponds to a frequency 3 dB lower than the amplitude of the frequency characteristic represented by the curve F3.

Figure 10:
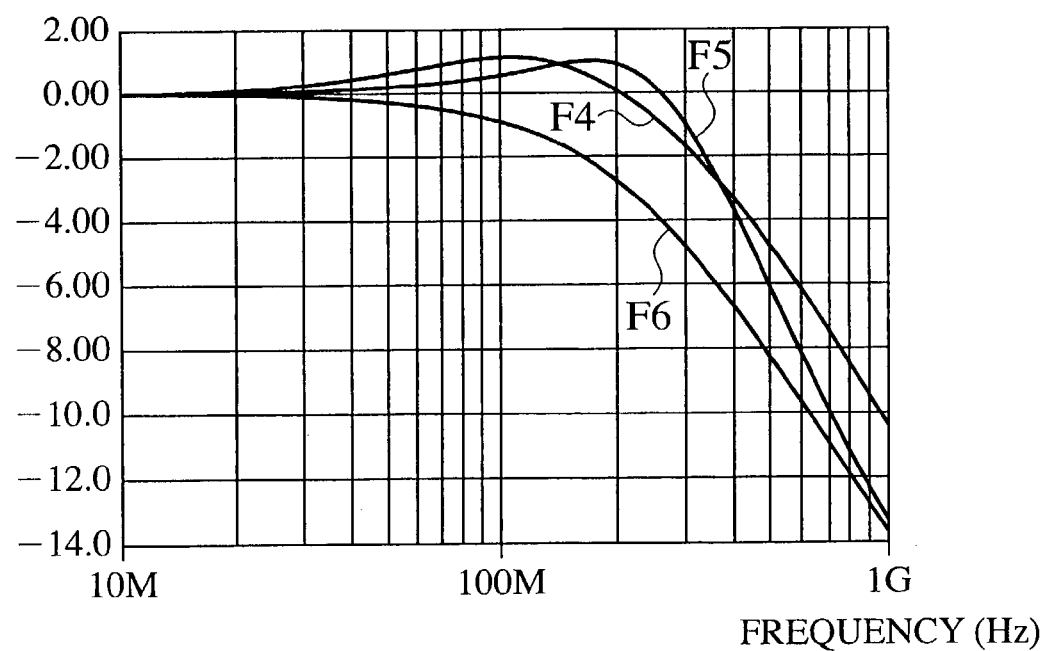
FIG. 10 shows the frequency response of the frequency characteristic compensator of a wideband amplifier according to the first embodiment of the present invention.
Figure 11:
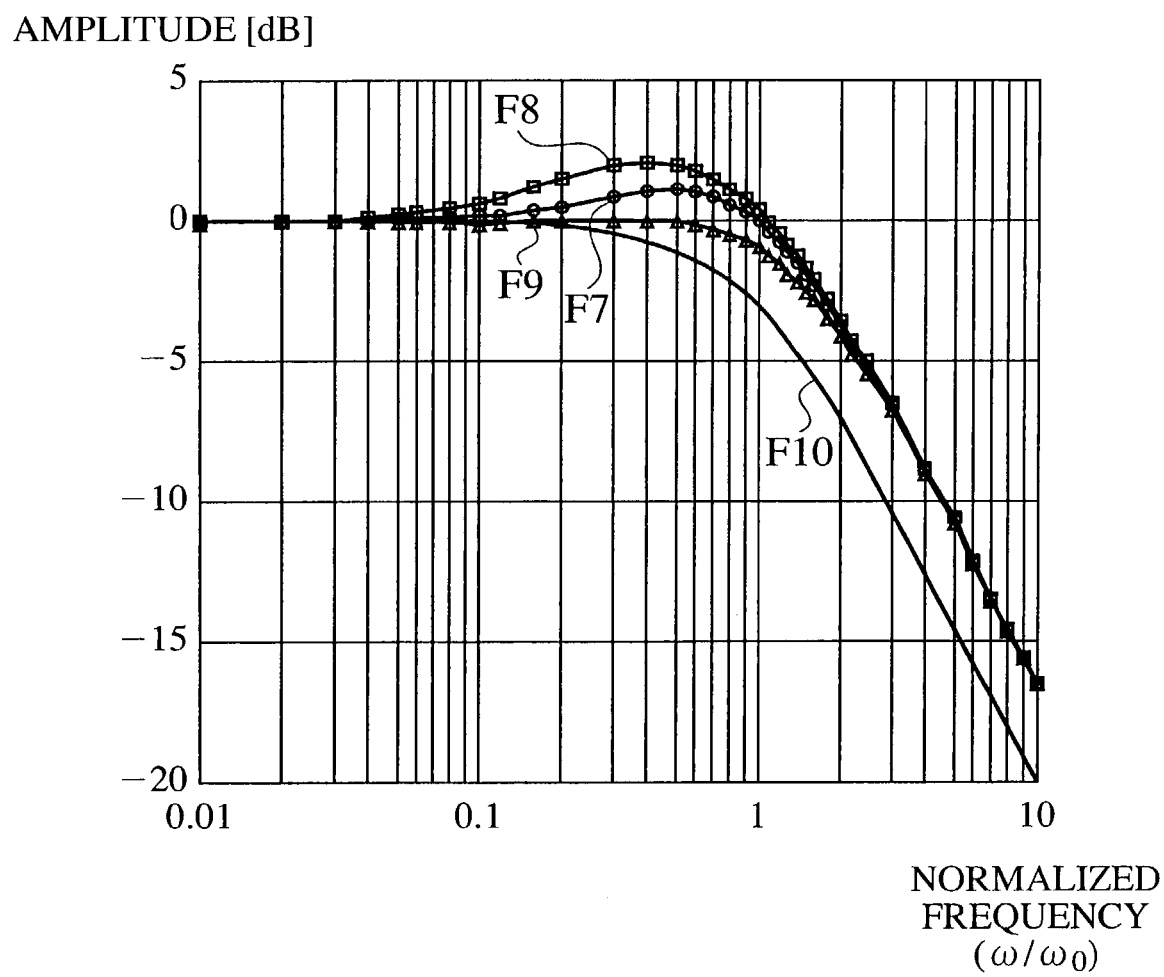
FIG. 11 shows the frequency response of the frequency characteristic compensator of a wideband amplifier according to the first embodiment of the present invention.

In a circuit shown in FIG. 7A, substituting C1=C10=2 pF, I1=150 μA, the frequency characteristic of wideband amplifier 10a is represented by a curve F4 of FIG. 10. In the circuit shown in FIG. 7B, substituting C101=1.3 pF, C102=2 pF, I1=150 μA, the frequency characteristic of the wideband amplifier using the cross coupling compensator is represented by a curve F5 of FIG. 10. In the circuit shown in FIG. 7A, substituting C10=2 pF, I1=150 μA, the wideband amplifier 10a is represented by a curve F6 of FIG. 10. The frequency characteristic shown in F4, F5, F6 is equal with a frequency characteristic derived a transfer function shown in FIG. 8A and FIG. 8B When equal current I1 is spread in the current source IEE101, and the current source IEE102, the frequency characteristic of a wideband amplifier related to prior art expressed in F5 of FIG. 10.

When the equal current flows the first constant current source IEE1 and the first buffering current source IEE2, and the equal current flow the second constant current source IEE3 and the second buffering current source IEE4, the frequency characteristic of the wideband amplifier according to the first embodiment is represented by the curve F4 of FIG. 10. The amplitude of the wideband amplifier 10a corresponds to the amplitude 3 dB higher than the frequency characteristic amplitude of the prior art.

The emitter follower circuit and the base reaching the ground circuit used in capacitor compensator 14 according to the present invention are the same as the buffer amplifier 13. Therefore, in comparison with cross coupling compensator 15, in capacitance compensator 14, there are a little phase delays.

When only buffer amplifier 13 is used in amplifier 12, a transfer function is showing such as F10. Substituting C10=re=1, C1=1 for Eq. (1), the transfer function is represented by a curve F7. Substituting C10=re=1, C1=2 for Eq. (1), the transfer function is represented by a curve F8. Substituting C10=re=1, C1=0.5 for Eq. (1), the transfer function is represented by a curve F9.

The frequency characteristic shown in F7, F8, F9, F10 can adjust the frequency range that wants to compensate by means of changing the first compensation capacitor C1 of the capacitance compensator 14. In addition, the second compensation capacitor C2 is changed, and an equal effect is provided substantially. The frequency characteristic of the thee-stage of wideband amplifiers 10a, but a transfer function of amplifier 12 is a transfer function of a differential amplifier driven in buffer amplifier 13 (emitter follower). The first buffering current source IEE2 as shown in FIG. 7A has current flowing as ½ of a current of the first constant current source IEE1. The first emitter resistance of buffering transistor Q21 as shown in FIG. 7A is represented by "2·re". In the signal equivalent circuit shown in FIG. 8A, the resistance "2·re" is represented by "3·re". This time, a transfer function T1(s) of the wideband amplifier 10a is expressed:

$$T1(s)=((1+4s \cdot C1 \cdot re)/(1+3(s \cdot re)^2 \cdot C10 \cdot C1 + s(C10 \cdot re + 3 \cdot C1 \cdot re)))(1/(1+s \cdot C10 \cdot re)) \quad (31)$$

Furthermore, when the transfer function of amplifier 12 is equal with the transfer function of amplifier 12 using buffer amplifier 13. The transfer function T2(s) of amplifier 12 driven by the emitter follower circuit is expressed:

$$T2(s)=(1/(1+s \cdot C10 \cdot re))(1/(1+s \cdot C10 \cdot re)) \quad (32)$$

Figure 12:
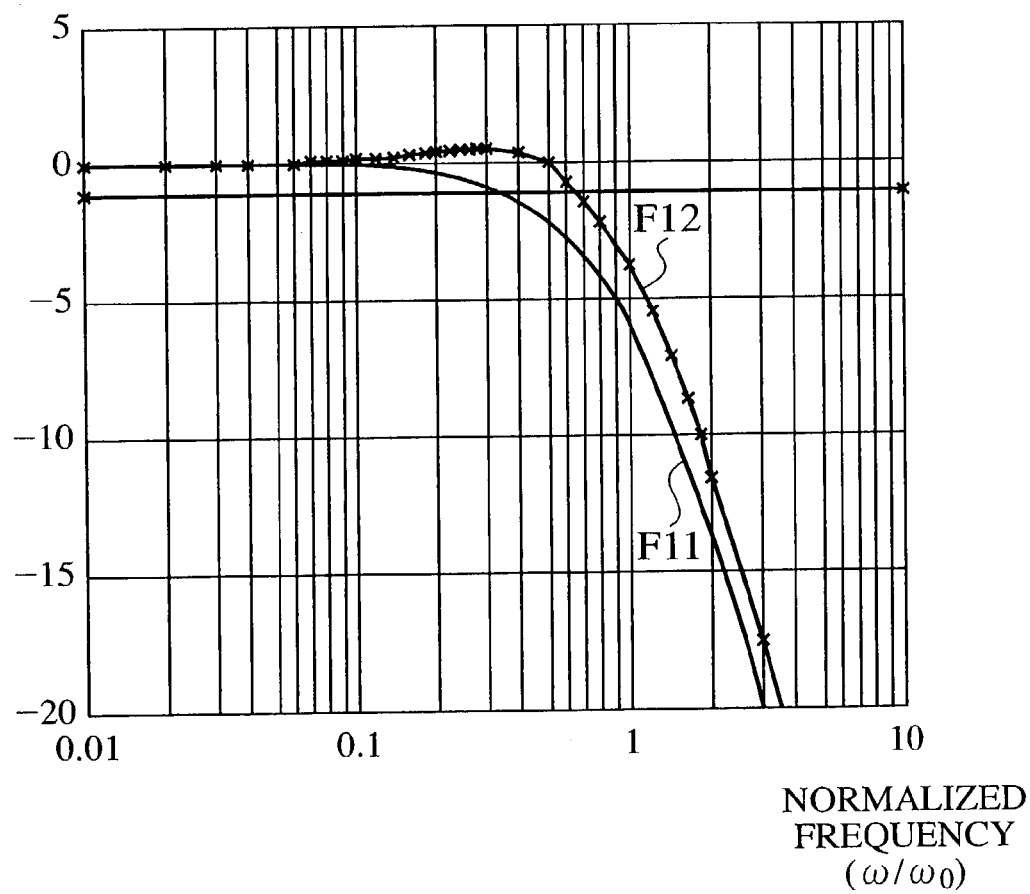
FIG. 12 shows the frequency response of the frequency characteristic compensator of a wideband amplifier according to the first embodiment of the present invention.

The calculation result of the transfer function in the wideband amplifier 10a simple substance is shown in FIG. 12. Nevertheless the normalized frequency ω is the frequency decreasing 6 dB from the amplitude of the Eq. (32). Substituting C10=re=1, for Eq. (32), the transfer function of a single-stage of amplifier is represented by curve F11. Substituting C1=C10=re=1, for Eq. (31), a transfer function of a single-stage amplifier using capacitance compensator 14 is represented by curve F12. When three-stage cascade connected amplifier implemented by the amplifiers 12, as shown in FIG. 12, the cutoff frequency corresponds to a frequency 1 dB lower than the cutoff frequency for the single stage of amplifier. For compensating the frequency character 1-dB roll-off so as to obtain wade band amplification, the bandwidth amplifier 12 can be turned into about 2 times by diverting half of the current flowing to the buffering transistor in the buffer amplifier 13. Furthermore, when the transfer function of the amplifier 12 differ from that of the buffer amplifier 13, the frequency characteristic function of the amplifier 12 can be compensated by adjusting a value of the first compensation capacitor C1.

Figure 13:
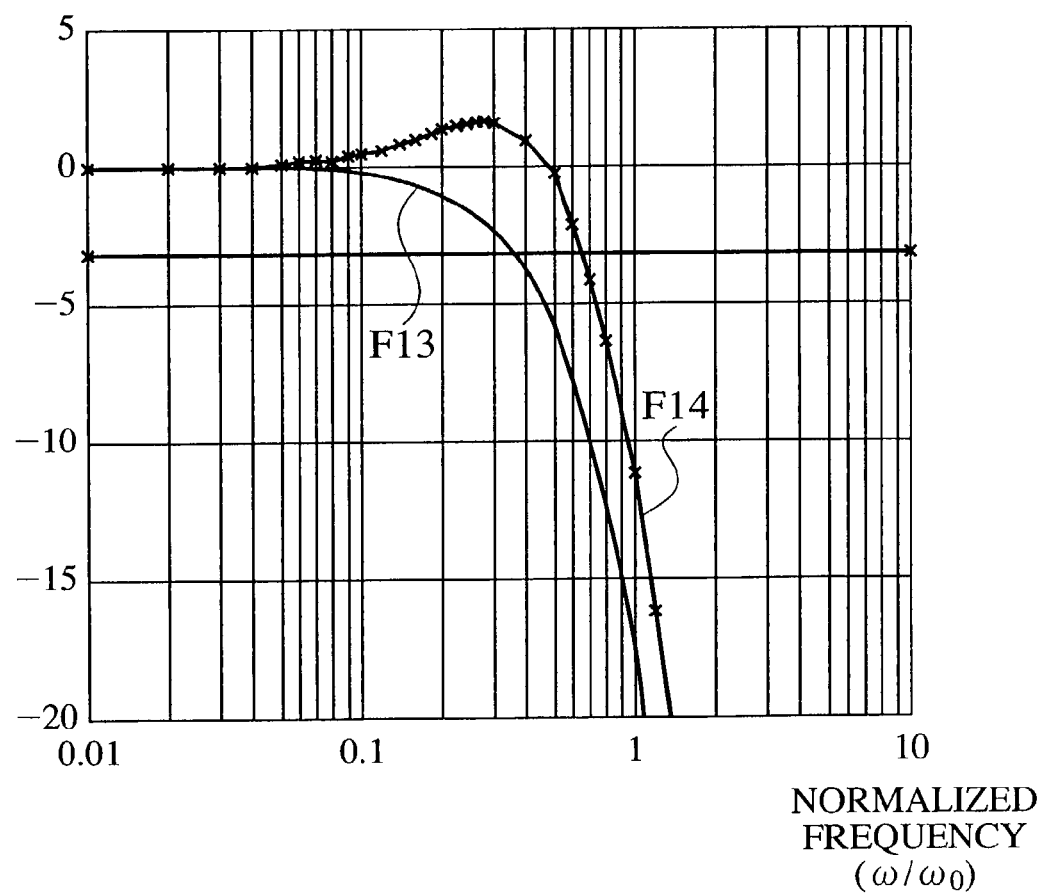
FIG. 13 is a diagram showing a configuration of the frequency response of the frequency characteristic compensator of a wideband amplifier according to the first embodiment of the present invention.

FIG. 13 shows a transfer function of three-stage amplifier, in which three amplifiers 12 are cascaded. F13 shows calculated value of the transfer function of three-stage amplifier 12 using the buffer amplifier 13 using the transfer function of $(T2(s))^3$. F14 is the calculated value of the transfer function of $(T1(s))^3$, when three-stage cascade connected amplifiers implemented by the amplifier 12 using the capacitance compensator.

In the frequency response of the transfer function shown in FIG. 13, when ½ of current flows to the buffering transistor in buffer amplifier 13, the cutoff frequency of the three-stage cascade connected amplifier implemented by the amplifiers 12, as shown in FIG. 12 has become about 2 times. Therefore, a necessary current for providing to the buffering transistor used in capacitance compensator 14 decreases with increasing number of stages of the multi-stage amplifier implemented by the amplifiers 12.

According to the first embodiment of the present invention, by compensating current flowing in the junction capacitance and the Mirror capacitance associated with the first and the second amplification transistor Q3 and Q4 serving as the load of the output of buffer amplifier 13, the bandwidth of the amplifier can be increased. Because the voltage to be required for the compensation is only the voltage between the control electrode and the emitter electrode of buffer amplifier 13, the wideband amplifier 10a can operate at lower by low voltages. Because a wide dynamic range of capacitance compensator 14 same as that of buffer amplifier 13 can be obtained, the dynamic range of the wideband amplifier 10a becomes wide, too. In addition, when the frequency characteristic of the output of wideband amplifier 10a is poor, the frequency characteristic can be compensated, and a wide band operation can be achieved. In particular the wide band operation can be achieved, suppressing current increase by increasing the number of stages of the multi-stage cascade connected amplifier implemented by the wideband amplifiers 10a. Because the circuit topology of the dual amplification transistor circuit is symmetric, the wideband amplifier 10a of the present invention can apply to the half-circuit.

The wideband amplifier, the radio transceiver, the semiconductor integrated circuit, and the wide band signal amplification method according to the first embodiment achieve the wide band amplification and the low voltage operation.

Figure 14:
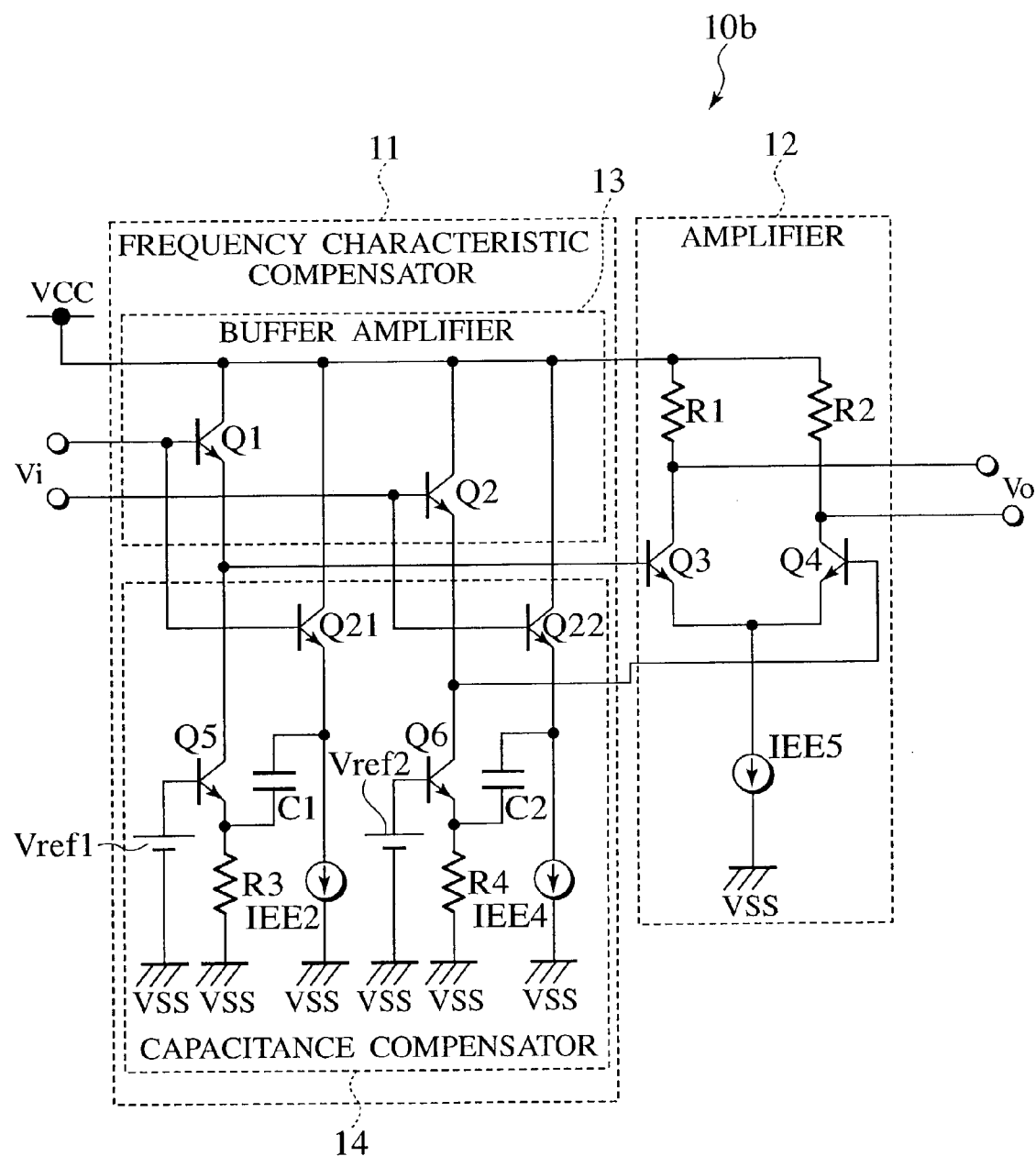
FIG. 14 is a diagram showing a configuration of a frequency characteristic compensator of the wideband amplifier according to the first embodiment of the present invention.

By replacing the first constant current source IEE1 with a third resistance R3, the second constant current source IEE3 with a fourth resistance R4 of the wideband amplifier 10a shown in FIG. 6, another wideband amplifier 10b can be implemented as shown in FIG. 14. The effectiveness of the wideband amplifier 10b is the same as the wideband amplifier 10a shown in FIG. 6.

Figure 15:
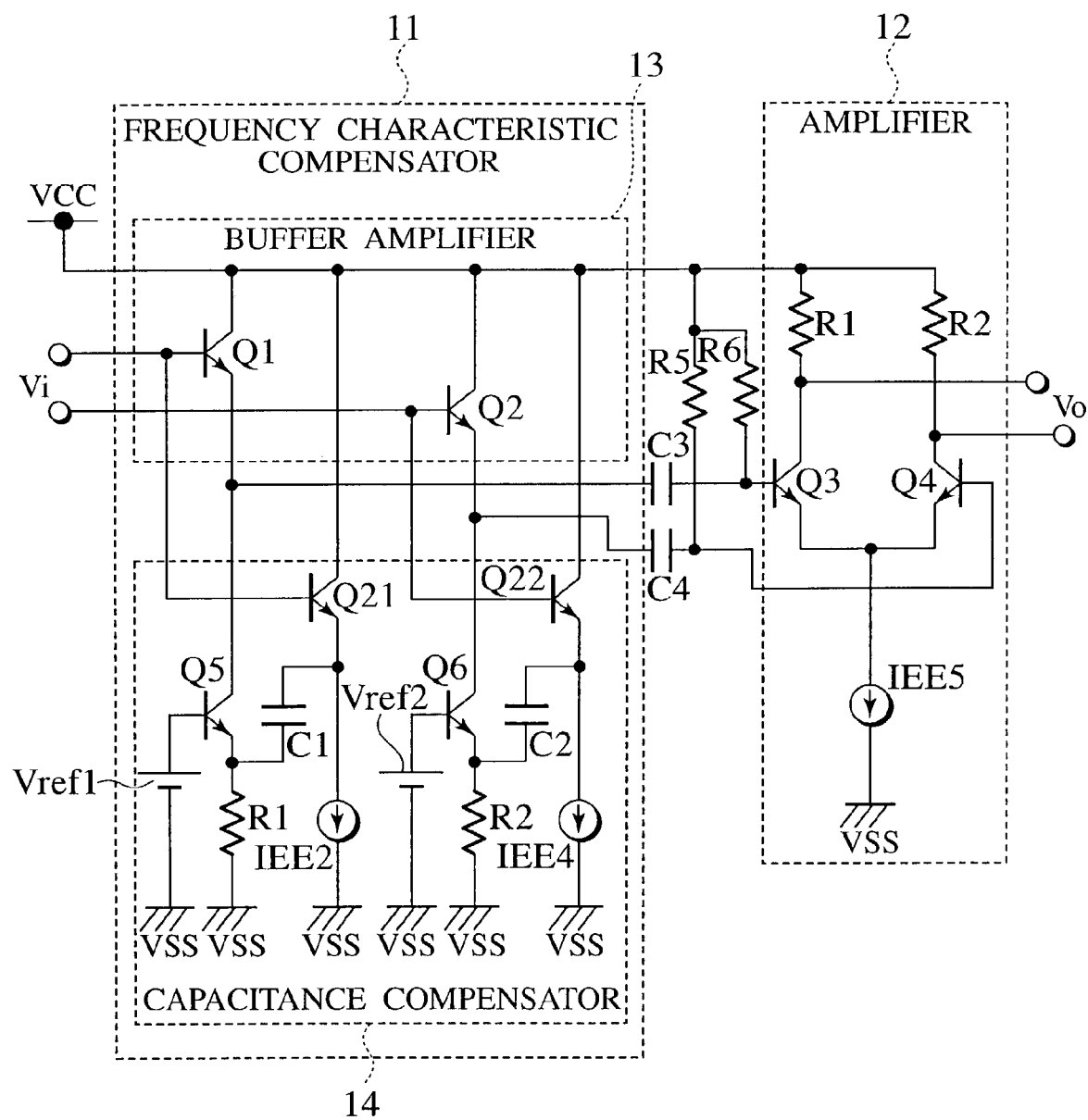
FIG. 15 is a diagram showing a configuration of a frequency characteristic compensator of the wideband amplifier according to the first embodiment of the present invention.

Furthermore the wideband amplifier 10b shown in FIG. 14 can be modified to a wideband amplifier 10c as shown in FIG. 15. The wideband amplifier 10c encompasses further a sixth resistance R6 connected between the control electrode of the first amplification transistor Q3 and the high voltage power supply VCC, a capacitance C3 connected between the output of the frequency characteristic compensator 11 and the control electrode of the first amplification transistor Q3, a fifth resistance R5 connected between the control electrode of the second amplification transistor Q4 and the high voltage power supply VCC, and a capacitance C4 connected between the output of the frequency characteristic compensator 11 and the control electrode of the first amplification transistor Q4. The wideband amplifier 10c can compensate the capacitances including the parasitic capacitance of the capacitor C3, the capacitor C4 so as to improve the frequency characteristic, thereby achieving similar effectiveness of comparison with the wideband amplifiers 10b. The effect of wideband amplifier 10c is equal with wideband amplifier 10a shown in FIG. 6. The configuration in which the capacitors C3 and C4 are connected between the frequency characteristic compensator 11 and the amplifier 12 achieves the low voltage operation of the wideband amplifier 10, because operating voltage dissipates in the buffer amplifier 13 and in between the control electrode and emitter electrode of the respective amplification transistors.

(Second Embodiment)

Figure 16:
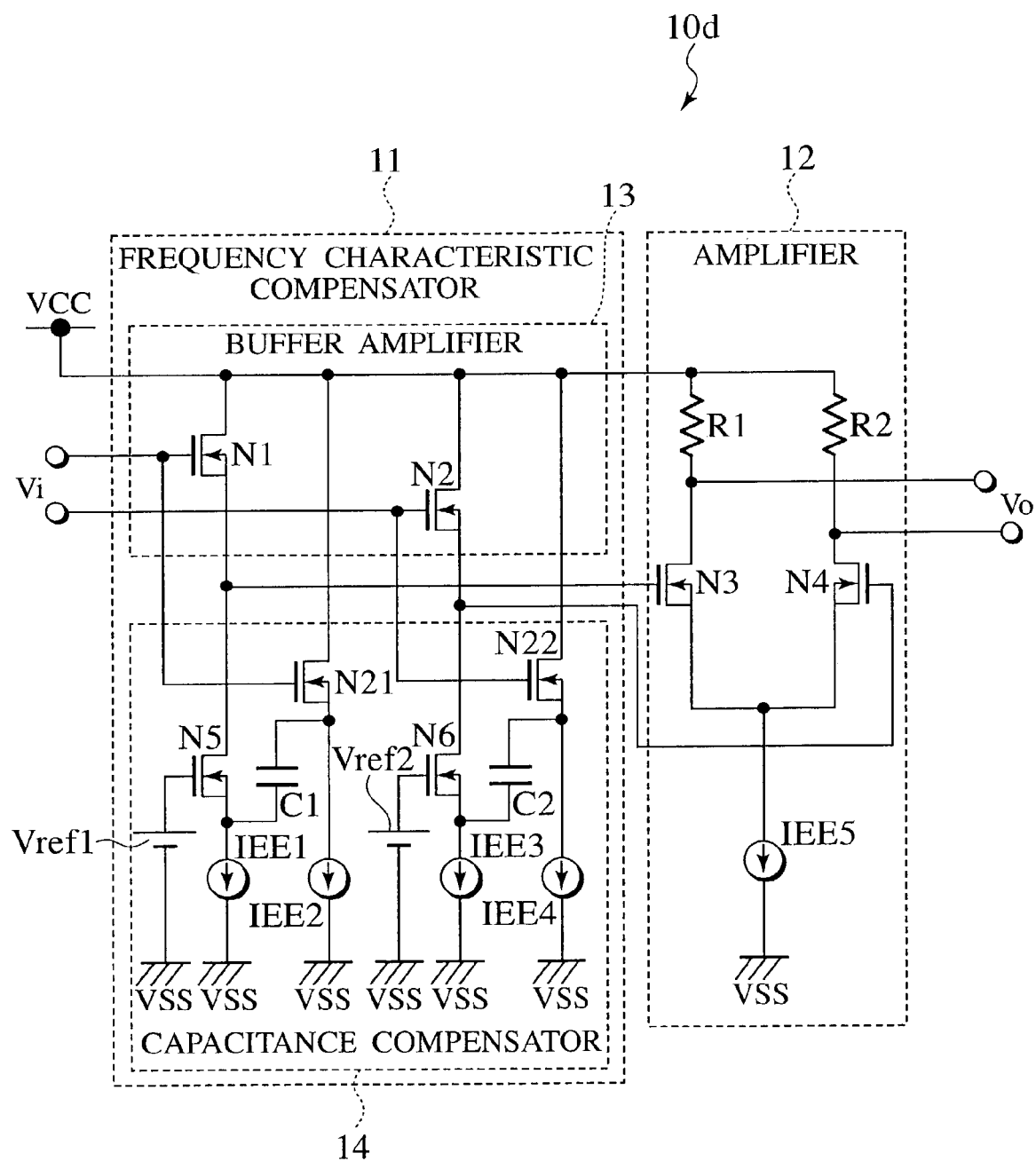
FIG. 16 is a diagram showing a configuration of a frequency characteristic compensator of the wideband amplifier according to the second embodiment of the present invention.

As shown in FIG. 16, the wideband amplifier 10d according to the second embodiment exchanged each npn type transistors into the nMOS transistors used in the wideband amplifier 10a according to the first embodiment. About the nMOS transistors, "a first main electrode" shall mean a drain electrode, "a second main electrode" shall mean a source electrode, "a control electrode" shall mean a gate electrode.

The buffer amplifier 13 includes a first drive nMOS transistor N1, and a second drive nMOS transistor N2. The first drive nMOS transistor N1 has a gate terminal connected to the high potential output side of the BPF23, a drain terminal connected to high voltage power supply VCC, and a source terminal used as an output terminal. The second drive nMOS transistor N2 has a gate terminal connected to the low potential output side of the BPF23, a drain terminal connected to high voltage power supply VCC, and a source terminal used as an output terminal.

Furthermore, the capacitance compensator 14 includes a first feedback nMOS transistor N5, a second feedback nMOS transistor N6, a first buffering nMOS transistor N21, a second buffering nMOS transistor N22, a first compensation capacitor C1 and a second compensation capacitor C2. The first feedback nMOS transistor N5 has a gate terminal connected to the first reference voltage Vref1 input side, a drain terminal connected to an output terminal of the first drive nMOS transistor N1, and a source terminal connected to the low voltage power supply VSS via the first constant current source IEE1. The second feedback nMOS transistor N6 has a gate terminal connected to the second reference voltage Vref2 input side, a drain terminal connected to an output terminal of the second drive nMOS transistor N2, and a source terminal connected to the low voltage power supply VSS via the third constant current source IEE3. The first buffering nMOS transistor N21 has a gate terminal and a drain terminal connected to parallel with the first drive nMOS transistor N1, and the source terminal used as an output terminal. The second buffering nMOS transistor N22 has a gate terminal and a drain terminal connected in parallel with the second drive nMOS transistor N2, and a source terminal used as an output terminal. The first compensation capacitor C1 has an end connected to a source terminal of the first feedback nMOS transistor N5, and another end connected to the first source terminal of buffering nMOS transistor N21. The second compensation capacitor C2 has an end connected to a source terminal of the second feedback nMOS transistor N6, and another end connected to the second source terminal of buffering nMOS transistor N22.

Furthermore, the amplifier 12 comprises a first amplification nMOS transistor N3 and a second amplification nMOS transistor N4. The first amplification nMOS transistor N3 has a gate terminal connected to a source terminal of the first drive nMOS transistor N1, a drain terminal connected to high voltage power supply VCC via the first resistance R1, and a source terminal connected to the low voltage power supply VSS via constant current source IEE5. The second amplification nMOS transistor N4 has a gate terminal connected to a source terminal of the second drive nMOS transistor N2, a drain terminal connected to high voltage power supply VCC via the second resistance R2, and a source terminal connected to the low voltage power supply VSS via constant current source IEE5.

Figure 17:
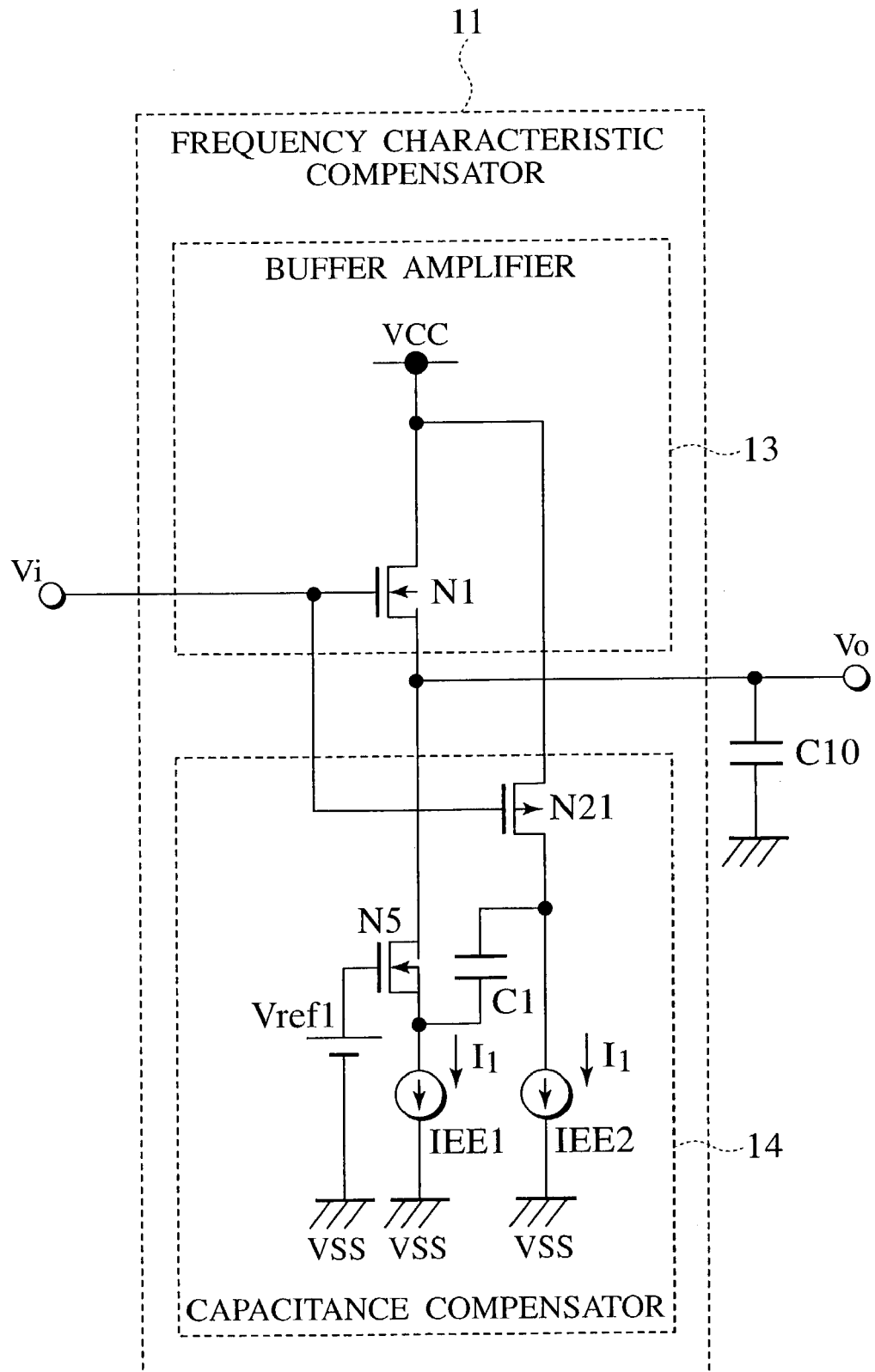
FIG. 17 is a diagram showing a configuration of a frequency characteristic compensator of the wideband amplifier according to the second embodiment of the present invention.

The wideband amplifier 10d can be expressed by a half-circuit of the first amplification nMOS transistor N3 side shown in FIG. 17, because the first amplification nMOS transistor N3 and the second amplification nMOS transistor N4 used in the amplifier 12 of the wideband amplifier 10d shown in FIG. 16 are symmetry. Nevertheless a half-circuit is an equivalent circuit when junction capacity of the first amplification nMOS transistor N3 was done with C10. Furthermore, the first amplification transistor Q3 of which own control electrode is not supplied any current.

The wideband amplifier 10d according to the second embodiment of the present invention enable to realize the wide band amplification.

Figure 18:
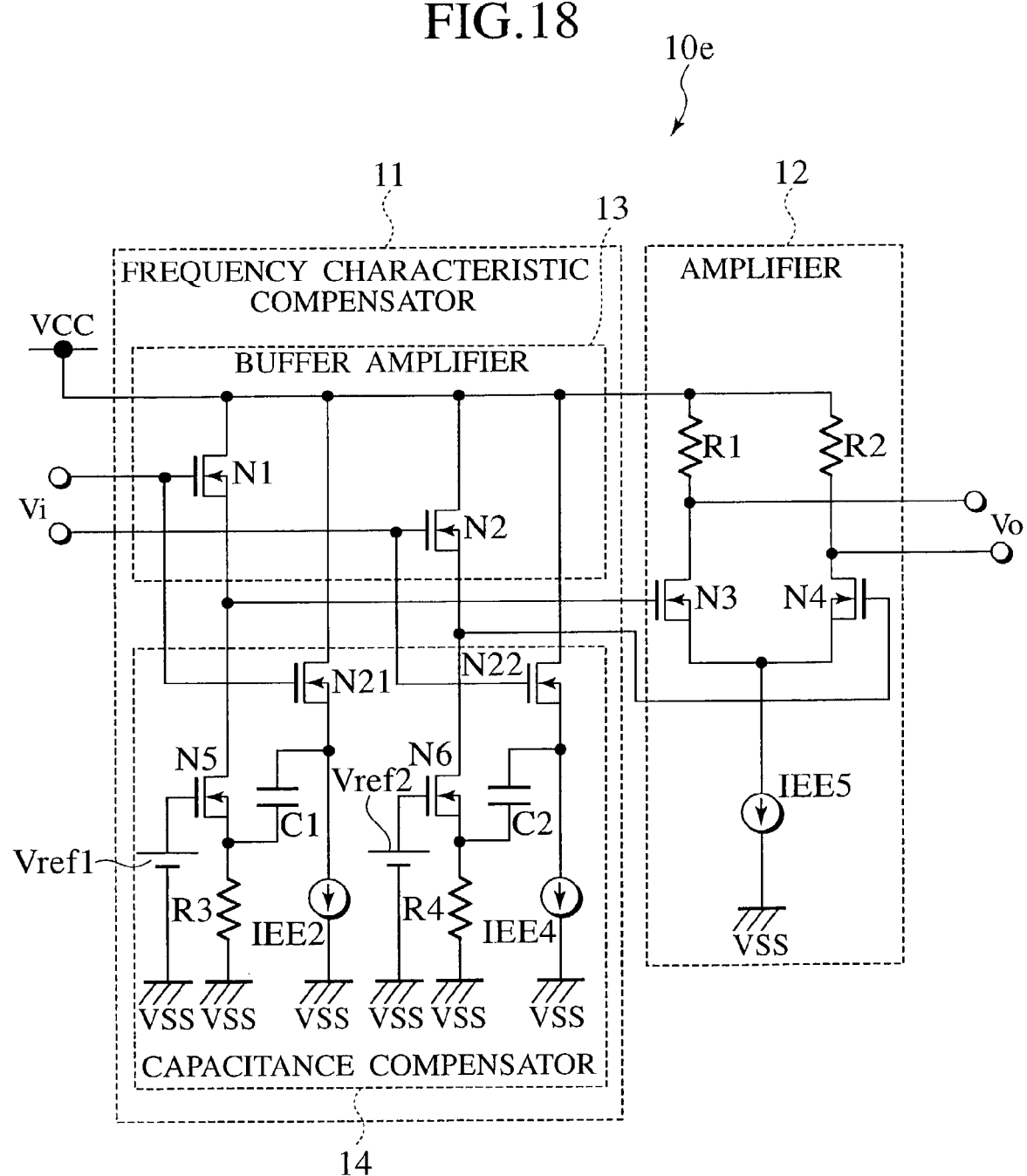
FIG. 18 is a diagram showing a configuration of a frequency characteristic compensator of the wideband amplifier according to the second embodiment of the present invention.

The wideband amplifier 10d shown in FIG. 16 is preferable as a wideband amplifier 10e as shown in FIG. 18. The first constant current source IEE1 of the wideband amplifier 10e is exchanged with the third resistance R3. The second constant current source IEE3 of the wideband amplifier 10e is exchanged with the fourth resistance R4. The effect of the wideband amplifier 10e resembles with the wideband the amplifier 10d shown in FIG. 16.

Figure 19:
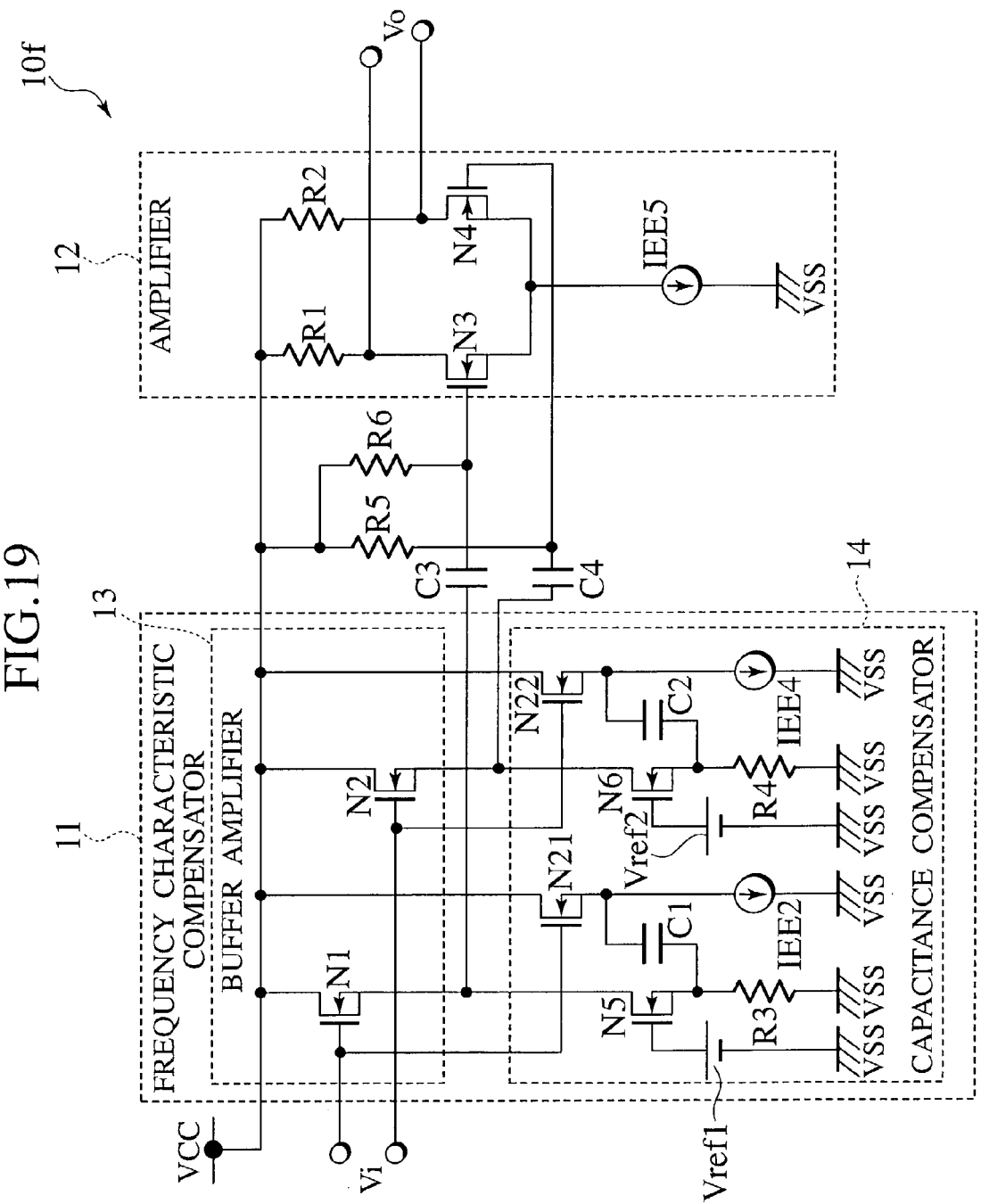
FIG. 19 is a diagram showing a configuration of a frequency characteristic compensator of the wideband amplifier according to the second embodiment of the present invention.

The wideband amplifier 10e shown in FIG. 18 can be exchanged with a wideband amplifier 10f as shown in FIG. 19. The wideband amplifier 10f includes the sixth resistance R6 connected between the high voltage power supply VCC and the gate terminal of the first amplification nMOS transistor N3, the capacitor C3 connected between each output of the frequency characteristic compensator 11, the fifth resistance R5 connected between the gate terminal of the second amplification nMOS transistor N4 and the high voltage power supply VCC, and the capacitor C4 connected between each output of the frequency characteristic compensator 11. Furthermore, the compensation capacitor C3 and C4 are effective in removing a direct current range.

(Third Embodiment)

Figure 20:
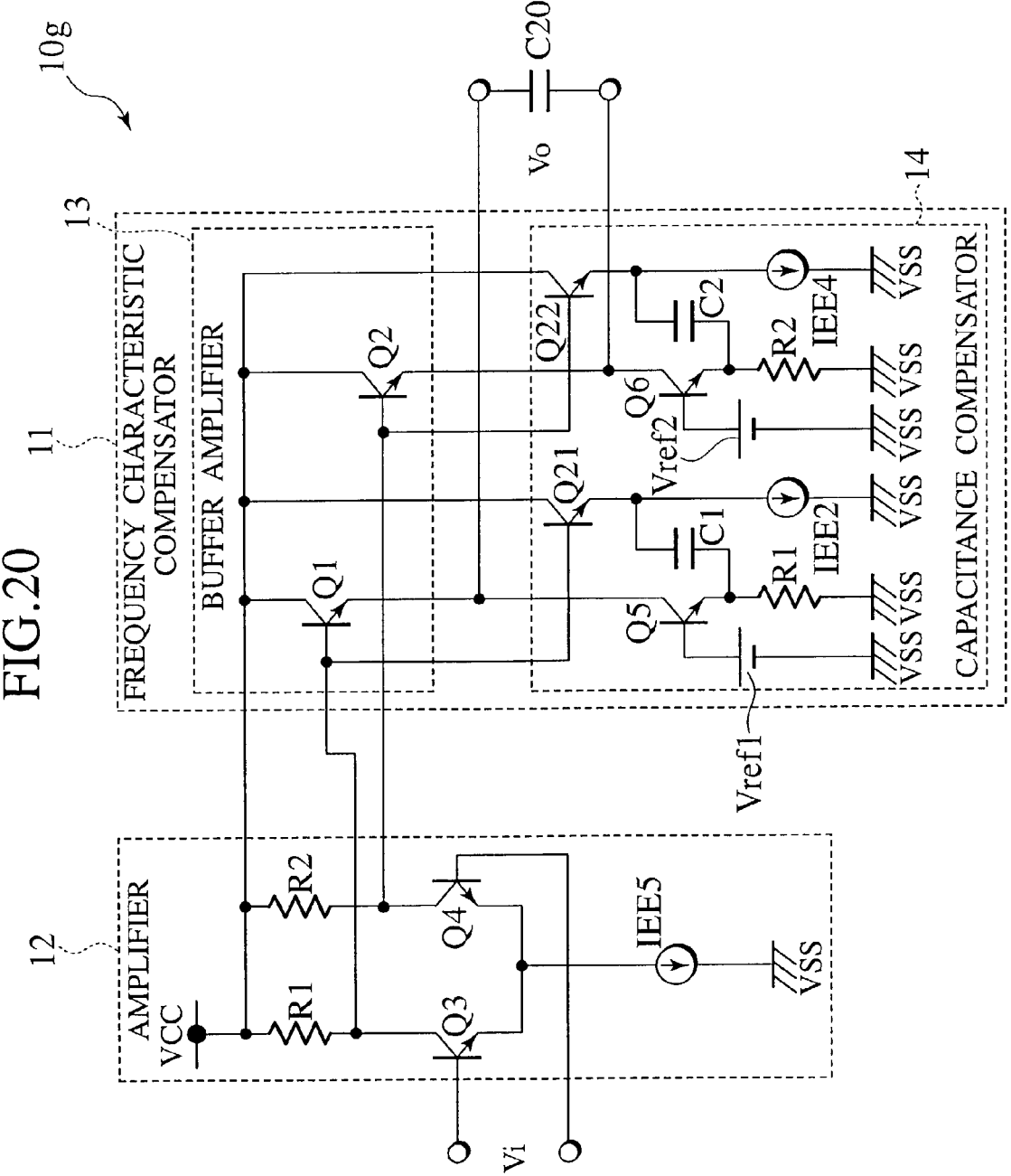
FIG. 20 is a diagram showing a configuration of a frequency characteristic compensator of the wideband amplifier according to the third embodiment of the present invention.

As shown in FIG. 20, the frequency characteristic compensator 11 of a wideband amplifier 10g according to the third embodiment of the present invention is connected to a latter half of amplifier 12, as against the frequency characteristic compensator 11 of the wideband amplifier 10a according to the first embodiment. Besides the above, the fourth embodiment is substantially similar to the first embodiment. Therefore, repeated description will be omitted.

The frequency characteristic compensator 11 supplies the compensation current to the input capacitance of the amplifier. As against this, the frequency characteristic compensator 11 according to the third embodiment is connected to the output side of amplifier 12, and the compensation current is supplied to the input capacitance of the load connected to the output side of amplifier 12.

The wideband amplifier 10g according to the fourth embodiment of the present invention enable to realize the wide band amplification and operating by low voltage.

(Fourth Embodiment)

Figure 21:
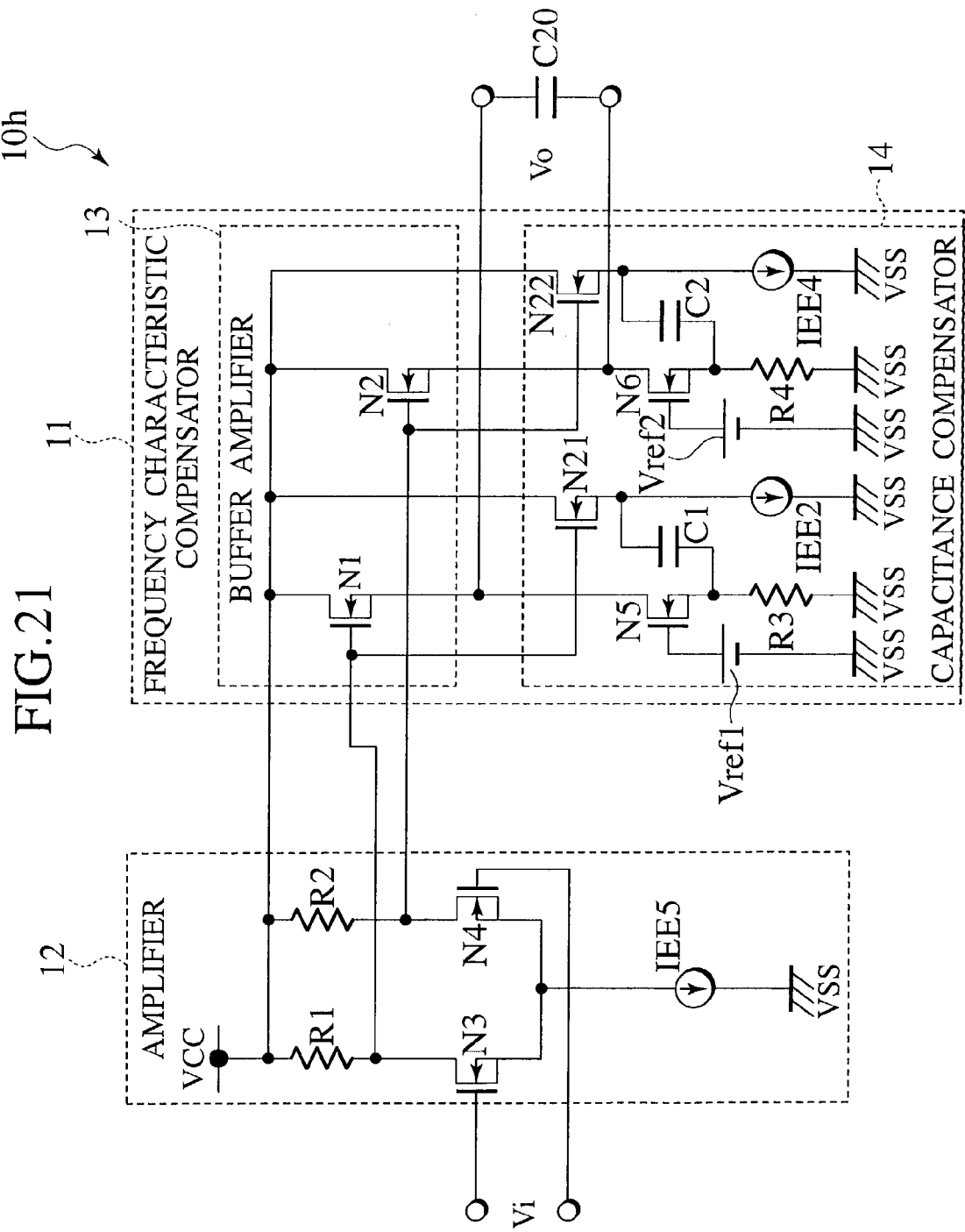
FIG. 21 is a diagram showing a configuration of a frequency characteristic compensator of the wideband amplifier according to the fourth embodiment of the present invention.

As shown in FIG. 21, the frequency characteristic compensator 11 of a wideband amplifier 10h according to the fourth embodiment of the present invention is connected to a latter half of amplifier 12, as against the frequency characteristic compensator 11 of the wideband amplifier 10d according to the second embodiment. Besides the above, the fourth embodiment is substantially similar to the first embodiment. Therefore, repeated description will be omitted.

The frequency characteristic compensator 11 supplies the compensation current to the input capacitance of the amplifier. As against this, the frequency characteristic compensator 11 according to the fourth embodiment is connected with in the output side of the amplifier 12, and the compensation current is supplied to the input capacitance of the load connected to the output side of the amplifier 12.

The wideband amplifier 10h according to the fourth embodiment of the present invention enables to realize the wide band amplification and operating by low voltage.

(Another Embodiment)

Each transistors using in the wideband amplifier 10a–10h is not limited, may use the Schottky barrier FET (MESFET), the junction type FET (JFET), the static induction transistor (SIT).

Various modifications will become possible for those skilled in the art after receiving the teachings of the present disclosure without departing from the scope thereof.

What is claimed is:

1. A radio transceiver comprising:
an antenna unit configured to convert the electromagnetic wave to a received signal;
a receiver including frequency characteristic compensators configured to generate first and second in-phase signals having a same phase of the received signal and a compensation current based on a capacitance determined by the second in-phase signal to generate a first feedback signal, and to supply the compensation current thorough a first feedback signal to an output capacitance, the receiver comprising:
a low noise amplifier connected to the antenna unit;
a mixer connected to output sides of the low noise amplifier and a local oscillator;
an automatic gain control amplifier connected to an output side of the mixer, the automatic gain control amplifier including:
a plurality of cascade connected wideband amplifiers; and
a gain controller connected to all of the wideband amplifiers; and
a quadrature demodulator connected to an output side of the automatic gain control amplifier;
a transmitter configured to supply a transmitting signal to the antenna unit;
a local oscillator configured to generate a clock for the receiver and the transmitter; and
a baseband circuit configured to process the received signal fed from the receiver and to generate the transmitted signal to be supplied to the transmitter,
wherein each of the wideband amplifier comprises:
an amplifier configured to generate a first amplification signal from the received signal; and
a frequency characteristic compensator configured to generate a first and second in-phase signal having a same phase of the first amplification signal, and to transfer a first compensation current to a load having an input capacitance or an output capacitance, the first compensation current being generated by the second-in-phase signal.

2. The radio transceiver of claim 1 wherein the frequency characteristic compensator comprises:
a buffer amplifier configured to generate the first in-phase signal; and
a capacitance compensator configured to generate the first compensation current for feed backing to the first in-phase signal based on the second in-phase signal.

3. The radio transceiver of claim 2 wherein the buffer amplifier includes a first drive-transistor having a control electrode configured to receive the received signal, a first main electrode connected to a high voltage power supply, and a second main electrode configured to output the first in-phase signal.

4. The radio transceiver of claim 2 wherein the capacitance compensator comprises:
a first buffering transistor having a control electrode configured to receive the received signal, a first main electrode connected to a high voltage power supply, a second main electrode configured to transmit the second in-phase signal;
a first compensation capacitor connected between the first main electrode and the second main electrodes of a buffering transistor;
a first buffering current source connected between the second main electrode of the first buffering transistor and a low voltage power supply;
a first feedback-transistor having a first main electrode connected to the main electrode of the first drive-transistor, a second main electrode connected to the low voltage power supply via a constant current source, a control electrode configured to receive reference voltage.

5. The radio transceiver of claim 2 wherein the capacitance compensator includes a first compensation capacitor configured to determine the first compensation current.

6. The radio transceiver of claim 2 wherein the capacitance compensator includes a second compensation capacitor configured to determine the second compensation current.

7. The radio transceiver of claim 1 wherein the frequency characteristic compensator generates a first and second opposite phase signals having opposite phases to each other based on the received signal, and generates a second compensation current based upon the second opposite phase signal serving as a second feedback signal adapted for feed back to the first opposite phase signal.

8. The radio transceiver of claim 1 wherein the amplifier is a differential amplifier configured to receive a first signal and a second signal having opposite phases as in the first signal.

9. The radio transceiver of claim 1 wherein the amplifier is a differential amplifier configured to receive the first and second compensation current.

* * * * *